United States Patent
Reddy et al.

(10) Patent No.: US 6,844,065 B2
(45) Date of Patent: Jan. 18, 2005

(54) PLASTIC FIBERS FOR IMPROVED CONCRETE

(75) Inventors: Hari P. Reddy, Midland, MI (US); Aleksander J. Pyzik, Midland, MI (US); Ted A. Morgan, Midland, MI (US); Sharon M. Allen, Midland, MI (US); Jill R. Marra, Old Bridge, NJ (US); Nicholas M. Shinkel, Bay City, MI (US)

(73) Assignee: Dow Global Technologies, Inc., Midland, MI (US)

( * ) Notice: Subject to any disclaimer, the term of this patent is extended or adjusted under 35 U.S.C. 154(b) by 149 days.

(21) Appl. No.: 10/327,736

(22) Filed: Dec. 23, 2002

(65) Prior Publication Data

US 2003/0134116 A1 Jul. 17, 2003

Related U.S. Application Data

(60) Provisional application No. 60/344,134, filed on Dec. 27, 2001.

(51) Int. Cl.[7] .................................................. D02G 3/00
(52) U.S. Cl. ........................ 428/375; 428/364; 428/373; 428/392
(58) Field of Search ................................. 428/375, 364, 428/373, 392, 397, 403, 407, 379

(56) References Cited

U.S. PATENT DOCUMENTS

| 4,584,347 A | * | 4/1986 | Harpell et al. | ............... 525/119 |
| 5,399,195 A | | 3/1995 | Hansen et al. | ............... 106/711 |
| 5,628,822 A | | 5/1997 | Hogan | ......................... 106/802 |
| 5,753,368 A | * | 5/1998 | Berke et al. | ................. 428/375 |
| 6,156,842 A | | 12/2000 | Hoenig et al. | ............... 525/171 |

FOREIGN PATENT DOCUMENTS

| JP | 2-199046 | 8/1990 |
| JP | 07330398 | 6/1994 |
| JP | 07330398 | 12/1995 |
| WO | 98/07668 | 2/1998 |

* cited by examiner

*Primary Examiner*—Merrick Dixon

(57) ABSTRACT

A monofilament plastic fiber useful in reducing plastic shrinkage cracking of concrete articles has been discovered. The fiber has a core that is a polyolefin that is at least partially enveloped by a sheath that is a copolymer of an olefin and at least one olefinically unsaturated comonomer selected from the group consisting of an unsaturated carboxylic acid, alkyl acrylate, alkyl methacrylate and vinyl ester.

8 Claims, No Drawings

PLASTIC FIBERS FOR IMPROVED CONCRETE

CROSS-REFERENCE TO RELATED APPLICATION

This application claims the benefit of U.S. Provisional Application Ser. No. 60/344,134, filed Dec. 27, 2001.

FIELD OF THE INVENTION

The invention relates to plastic fibers for toughening and strengthening concrete and the concrete containing the fibers.

BACKGROUND OF THE INVENTION

Generally, concrete is a brittle material with high compressive strength but low tensile strength. In the concrete industry, all concrete work is typically specified on the basis of the compressive strength. Any attempt to improve the crack strength (tensile strength) and toughness of the concrete almost always requires the introduction of reinforcing addition. For example, rebar (steel rods) are added which provides structural integrity but does not eliminate cracking. Metal mesh has also been added to reduce cracking but it cannot be used effectively to reinforce concrete of complex geometry.

Fine monofilaments of plastic fibers have been used to improve the tensile strength and to reduce plastic shrinkage cracking. Plastic shrinkage cracking occurs from constraints on the shrinkage as it sets. The constraints arise, for example, from the concrete being cast on a bed of rocks to make a road. However, these fine monofilaments almost have no effect on the tensile or bending strength of the cured concrete. To improve the strength (i.e., improve the structural integrity of the concrete), steel rebar or mesh have generally needed to be added.

Examples of plastic fibers include polypropylene (PP), polyethylene (PE), polyethylene terephthalate (PET), aramids (e.g., KEVLAR) and polyvinyl alcohol fibers. However, all of these fibers suffer from one or more problems, such as high cost, low alkaline resistance, low tenacity or low interfacial bonding between the concrete and the fiber.

Polypropylene and polyethylene have been the most preferred fiber to date due to their high tenacity and low cost. Unfortunately, these fibers suffer from very low interfacial bonding. To remedy this problem, coatings have been formed on the surface of the fibers by applying a liquid, such as gycerol ether or glycol ether on the fiber surface, as described by WO 980766. Coatings have also been applied by vapor deposition, such as described by JP60054950. Similarly, chemically modifying the surface has been done, such as described by JP 10236855 (treatment of the surface of a polyoxyalkylenephenyl ether phosphate and polyoxalkyl fatty acid ester). Unfortunately, these methods naturally lead to increased cost, complexity and potentially insufficient bonding of the coating to the fiber.

Another remedy has been the incorporation of inorganic particles in and on the fiber, such as described by JP 07002554. Unfortunately, the fiber process becomes much more difficult (e.g., fiber breakage) and increases the cost and generally decreases the tenacity of the fiber.

Further, it is known that larger fibers are preferable for improving the toughness of the concrete and strength. Unfortunately, larger fibers further exacerbate the problem of bonding with the concrete matrix because of reduced surface area. In addition, none of these methods address another problem associated with plastic fibers in concrete, which is the tendency of larger fibers to clump together into balls that are difficult to break up when added to concrete, resulting in reduced properties of the concrete.

Accordingly, it would be desirable to provide an improved fiber for improving the properties of concrete, for example, that improves one or more of the problems of the prior art, such as improving the plastic shrinkage cracking and strength without the problems large fibers cause.

SUMMARY OF THE INVENTION

We have now discovered a new fine monofilament fiber that improves both plastic shrinkage cracking and strength of concrete without the use of larger fibers, meshes or steel rebar.

A first aspect of the invention is a monofilament reinforcing fiber comprised of a core that is a polyolefin, that is at least partially enveloped by a sheath, that is a copolymer of an olefin and at least one olefinically unsaturated comonomer selected from the group consisting of an unsaturated carboxylic acid, alkyl acrylate, alkyl methacrylate and vinyl ester.

A second aspect of the invention is a concrete article comprised of concrete having therein the monofilament reinforcing fiber of aspect 1 of the invention.

The reinforcing fiber may be used in any low temperature cured inorganic article such as concrete, mortar, gypsum, wall board, and the like. The concrete of this invention may be used in any application suitable for concrete, but it is especially well-suited for parking garages, bridge decks, white toppings, tunnels, mining, slope stabilization, architectural purposes, such as landscaping stones, skate boarding rinks, modern architecture, art sculptures, fast setting/non-slumping ceilings, swimming pools, and for repairing and retrofitting existing structures.

DETAILED DESCRIPTION OF THE INVENTION

The Reinforcing Fiber

The reinforcing fiber is a monofilament comprised of a core that is at least partially enveloped by a sheath. The core is comprised of a polyolefin. By the term "polyolefin" is meant a polymer or copolymer derived from simple olefin monomers, such as ethylene, propylene, butylene, isoprene and the like and may include one or more monomers copolymerizable therewith, not including the comonomers of the sheath polymer described herein. Such polymers (including raw materials, their proportions, polymerization temperatures, catalysts and other conditions) are well-known in the art and reference is made thereto for the purpose of this invention.

The polyolefins, for example, include polypropylene, polyethylene, and copolymers and blends thereof, as well as ethylene-propylene-diene terpolymers. Preferred polyolefins are polypropylene, linear high density polyethylene (HDPE), heterogeneously-branched linear low density polyethylene (LLDPE), such as DOWLEX polyethylene resin (a trademark of The Dow Chemical Company), heterogeneously-branched ultra low linear density polyethylene (ULDPE), such as ATTANE ULDPE (a trademark of The Dow Chemical Company); homogeneously-branched, linear ethylene/α-olefin copolymers, such as TAFMER (a trademark of Mitsui Petrochemicals Company Limited) and EXACT (a trademark of Exxon Chemical Company); homogeneously branched, substantially linear ethylene/α-olefin polymers, such as AFFINITY (a trademark of The Dow Chemical Company) and ENGAGE (a trademark of DuPont Dow Elastomers L.L.C) polyolefin elastomers, which can be prepared as disclosed in U.S. Pat. Nos. 5,272,236 and 5,278,272; and high pressure, free radical polymerized ethylene polymers and copolymers, such as low density polyethylene (LDPE). More preferred polyolefins are the homogeneously-branched linear and substantially linear ethylene copolymers with a density (measured in accordance with ASTM D-792) of 0.85 to 0.99 g/cm$^3$, a weight average molecular weight to number average molecular weight ratio (Mw/Mn) from 1.5 to 3.0, a measured melt index (measured in accordance with ASTM D-1238 (190/2.16)) of 0.01 to 100 grams per 10 minutes, and an I10/I2 of 6 to 20 (measured in accordance with ASTM D-1238 (190/10)).

When a high density polyethylene (HDPE) is used as the polyolefin, it, generally, has a density of at least about 0.94 gram per cubic centimeter (g/cc) (ASTM Test Method D-1505). HDPE is commonly produced using techniques similar to the preparation of linear low density polyethylenes. Such techniques are described in U.S. Pat. Nos. 2,825,721; 2,993,876; 3,250,825 and 4,204,050. The preferred HDPE employed in the practice of the present invention has a density of from 0.94 to 0.99 g/cc and a melt index of from 0.01 to 35 grams per 10 minutes, as determined by ASTM Test Method D-1238.

Preferably the core is a homopolymer selected from the group consisting of polypropylene and polyethylene. Most preferably, the core is polypropylene having a melt flow rate of from about 4 to 20, such as those available under the trade name INSPIRE (Dow Chemical Co., Midland, Mich.).

The sheath is a copolymer of an olefin selected from the group consisting of ethylene, propylene, butylene, isoprene and mixture thereof and at least one olefinically unsaturated comonomer selected from the group consisting of an unsaturated carboxylic acid, alkyl acrylate, alkyl methacrylate, vinyl ester and mixture thereof. Preferably, the olefin is ethylene or propylene. More preferably, the olefin is ethylene. Preferably, the comonomer is a carboxylic acid. More preferably, the comonomer is acrylic acid or methacrylic acid. Most preferably, the comonomer is acrylic acid.

Preferred sheath copolymers of ethylene and the comonomer are described by U.S. Pat. Nos. 4,599,392; 4,988,781 and 5,384,373, each incorporated herein by reference. A particularly preferred copolymer is a copolymer of ethylene and acrylic acid, such as those available under the trademark PRIMACOR (The Dow Chemical Company, Midland, Mich.). Other examples of the sheath copolymer include ethylene-vinyl acetate (EVA) copolymers, such as ESCORENE polymers (a trademark of Exxon Chemical Company), and ELVAX (a trademark of E.I. du Pont de Nemours & Co.).

Generally, the copolymer is a copolymer of at least about 1 percent to at most about 50 percent by weight of the comonomer. Preferably, the copolymer is a copolymer of at least about 2 percent, more preferably at least about 5 percent, more preferably at least about 10 percent and most preferably at least about 20 percent to preferably at most about 45 percent, more preferably at most about 40 percent and most preferably at most about 38 percent by weight of the comonomer.

Generally, the polyolefin core comprises at least about 50 percent by volume to at most about 95 percent by volume of the reinforcing fiber. Preferably, the core polymer comprises at least about 60 percent, more preferably at least about 70 percent and most preferably at least about 75 percent to preferably at most about 94 percent, more preferably at most about 90 percent and most preferably at most about 88 percent.

The reinforcing fiber may be any shape (i.e., shape of the cross-section) such as round, square, triangular, lobed, star and sheet (i.e., similar to a tape). However, the diameter should not be so large that the fibers fail to improve the plastic shrinkage cracking at a typical loading in concrete (e.g., 0.01 percent to 0.2 volume percent). The diameter of the fiber should also not be so small that it becomes difficult to add to concrete and/or deleteriously affects the rheology of the concrete mix. The diameter, as expressed by denier (mass in grams of a fiber 9000 meters long), of the fiber generally is at least about 0.1 to at most about 50 denier. Preferably, the denier is at least about 1, more preferably at least about 1.5 and most preferably at least about 2 to preferably at most about 30, more preferably at most about 20 and most preferably at most about 12.

The sheath at least partially envelops the core polymer. "Partially," generally, means that at least about 10 percent of the surface of the core polymer is covered by the sheath polymer. Preferably at least about 20 percent, more preferably at least about 50 percent, even more preferably at least about 75 percent and most preferably at least about 90 percent of the surface of the core polymer is covered by the sheath. A preferred embodiment includes when the sheath essentially covers the entire surface of the core polymer or entirely covers the surface of the core polymer. Of course, "entirely covers" does not include the cut ends of the fiber.

Forming the Reinforcing Fiber

In general, the fibers may be formed by well-known processes, such as melt spinning, wet spinning or conjugate spinning. The fibers of the present invention may be extruded into any size or length desired. They may also be extruded into any shape desired, such as, for example, cylindrical, cross-shaped, trilobal or ribbon-like cross-section.

The fibers may have the following fiber cross-section structures:

(1) Side-by-side
(2) Sheath-core
(3) Islands-in-the sea and
(4) Citrus (Segmented pie)

(1) Side-By-Side

A method for producing side-by-side bicomponent fibers is described in U.S. Pat. No. 5,093,061, which is incorporated herein by reference. The method comprises (1) feeding two polymer streams through orifices separately and converging at substantially the same speed to merge side-by-side as a combined stream below the face of the spinneret; or (2) feeding two polymer streams separately through orifices, which converge at the surface of the spinneret, at substantially the same speed to merge side-by-side as a combined stream at the surface of the spinneret. In both cases, the velocity of each polymer stream at the point of merge is determined by its metering pump speed and the size of the orifice. The fiber cross-section has a straight interface between two components.

Side-by-side fibers are generally used to produce self-crimping fibers. All commercially available self-crimping fibers are produced by using a system based on the different shrinkage characteristics of each component.

(2) Sheath-Core

Sheath-core bicomponent fibers are those fibers where one of the components (core) is fully surrounded by a second component (sheath). Adhesion is not always essential for fiber integrity.

The most common way to produce sheath-core fibers is a technique in which two polymer liquids (melts) are separately led to a position very close to the spinneret orifices and then extruded in sheath-core form. In the case of concentric fibers, the orifice supplying the "core" polymer is in the center of the spinning orifice outlet and flow conditions of core polymer fluid are strictly controlled to maintain the concentricity of both components when spinning. Modifications in spinneret orifices enable one to obtain different shapes of core or/and sheath within the fiber cross-section.

The sheath-core structure is employed when it is desirable for the surface to have the property of one of the polymers, such as luster, dyeability or stability, while the core may contribute to strength, reduced cost and the like. The sheath-core fibers are used as crimping fibers and as bonding fibers in the non-woven industry.

Methods for producing sheath-core bicomponent fibers are described in U.S. Pat. Nos. 3,315,021 and 3,316,336, both of which are incorporated herein by reference.

(3) Islands-In The-Sea

Islands-in-the sea fibers are also called matrix-filament fibers, which include heterogeneous bicomponent fibers. A method for producing islands-in-the sea fibers is described in U.S. Pat. No. 4,445,833, incorporated herein by reference. The method comprises injecting streams of core polymer into sheath polymer streams through small tubes with one tube for each core stream. The combined sheath-core streams converge inside the spinneret hole and form one island-in-the sea conjugate stream.

Mixing the different polymer streams with a static mixer in the spinning process also makes island-in-the-sea bicomponent fibers. The static mixer divides and redivides the polymer stream to form a matrix stream with multiple cores. This method for producing island-in-the-sea fibers is described in U.S. Pat. No. 4,414,276, which is incorporated herein by reference.

The islands-in-the-sea structure is employed when it is desirable to increase the modulus of the fiber, reduce moisture regain, reduce dyeability, improve the texturing capability or give the fiber a unique lustrous appearance.

(4) Citrus Type (Segmented Pie)

The citrus type bicomponent or segmented pie bicomponent fibers can be made by polymer distribution and/or spinneret modifications of the pack assemblies employed in the methods described above for producing the side-by-side, sheath-core or islands-in-the-sea fibers. For example, by introducing a first polymer stream and a second polymer stream alternately through eight radial channels toward the spinneret hole instead of two channels, the resultant fiber is an eight-segment citrus-type fiber. If the spinneret orifice has the configuration of three or four slots on a circle (a common orifice configuration to produce hollow fibers), the fiber is a hollow citrus-type fiber with eight segments. The hollow citrus-type fiber can also be made by the use of special spinneret orifice configurations with a sheath-core spin pack, as described in U.S. Pat. Nos. 4,246,219 and 4,357,290, both of which are incorporated herein by reference.

The Concrete Article

The concrete article of this invention is comprised of concrete having therein a monofilament reinforcing fiber of this invention. That is to say, the fiber is a monofilament reinforcing fiber comprised of a core that is a polyolefin that is at least partially enveloped by a sheath that is a copolymer of an olefin and at least one olefinically unsaturated comonomer selected from the group consisting of an unsaturated carboxylic acid, alkyl acrylate, alkyl methacrylate and vinyl ester.

The concrete used to form the concrete article of this invention may be any suitable concrete, such as those known in the art. Generally, the concrete is a mixture comprised of Portland cement. Portland cement is used as is commonly understood in the art and defined by *Hawley's Condensed Chemical Dictionary* $12^{th}$ Ed., R. Lewis, Van Nostrand Co., NY, p 239, 1993.

It is understood that the reinforcing fiber in the concrete is a solid at ambient conditions. That is, the polymer is added as a solid object and is a solid after the concrete is cured.

The amount of reinforcing fiber in the concrete generally ranges from about 0.01 volume percent to about 10 volume percent of the concrete article. Preferably, the amount of the reinforcing polymer is at least about 0.015 percent, more preferably at least about 0.2 percent and most preferably at least about 0.25 percent to preferably at most about 5 percent, more preferably at most about 2 percent and most preferably at most about 1 percent by volume of the article.

Forming the Concrete Article

The concrete article may be made by mixing the reinforcing fiber, water and concrete in any suitable manner. Preferably, the concrete dry components (e.g., cement sand and gravel) are dry mixed first and then water is mixed to make a wet mixture.

Generally, the concrete is mixed with the reinforcing fiber for at least about 30 seconds to at most about 4 hours. Preferably, the mixing time is at least about 1 minute, more preferably at least about 10 minutes and most preferably at least about 20 minutes to preferably at most about 3 hours, more preferably at most about 2 hours and most preferably at most about 1 hour.

To the mixture, other additives useful in the formation of concrete may be added, such as a polymeric emulsion of styrene-butadiene, epoxy, polyurethane, and ethylene-styrene and synthetic polymer emulsions of the polymers described herein.

EXAMPLES

Examples of Reinforcing Fibers

Example 1

The fiber was produced at Fibers Innovation Technologies, Johnson City, Tenn. using commercially available melt spinning equipment. The fiber had a round cross-sectional shape and a denier of about 2. The fiber was a sheath/core fiber where the sheath comprised 20 percent by volume of the fiber. The sheath polymer was an ethylene-acrylic acid copolymer available from The Dow Chemical Company (Midland, Mich.) under the trade name PRIMACOR 3460. The core polymer was a 12 melt flow rate polypropylene (INSPIRE H509-12G polypropylene available from The Dow Chemical Company, Midland, Mich.).

The conditions used to make the fiber were as follows. The temperatures of the zones of the extruder containing the core polymer were: zone 1: 210° C.; zone 2: 220° C.; zone 3: 230° C. and zone 4: 230° C. with zone 4 being the zone adjacent to the spin head. The temperatures of the zones containing the sheath polymer were: zone 1: 135° C.; zone 2: 145° C.; zone 3: 165° C. and zone 4: 190° C. The extrusion pressure was 1100 pounds per square inch (psi).

The spin head temperature was 245° C. The quench air temperature was 15° C. The denier roll speed was 1000 meters per minute (m/min). The draw roll speed was 1000 m/min. The draw ratio was 3.85 to 1. The fibers were about 2 denier and were chopped to a length of about 18 millimeters (mm).

Average Residual Strength Concrete Examples
Example 2 (Concrete Containing 0.2 Volume Percent Fibers)

A concrete mixture was prepared by blending 1 part by weight (pbw) of Portland cement (Holnam Type 1), 2.38 pbw of sand (2NS), 1.95 pbw of Pea Gravel, 0.545 pbw of tap water, 0.0061 pbw of RHEOBUILD 1000 available from Master Builders, Cleveland, Ohio, and 0.2 volume percent of the fibers of Example 1.

In preparing the concrete, the dry ingredients (e.g., cement, sand and gravel) were first added and dry mixed for about 3 minutes. The liquid ingredients (water and RHEOBUILD) were added while stirring for about 30 seconds and mixed for another 60 seconds. The mixer was stopped and scraped and turned back on for an additional 4 minutes. The fiber was then added and mixed for about 3 minutes with periodic scraping. The mix was then cast into 4"×4"×14" (inches) bars as per ASTM C 192. The bars were covered with a damp cloth and cured for 24 hours and then removed and cured in a lime saturated water bath for a total cure time of 14 days.

The average residual strength (ARS) of the cured bars was determined by using ASTM C-1399 as a guide. Bars were first precracked on an Instron 8502 by placing the bar on a 0.5 inch thick bar having the same width and length as the concrete bar and subjecting the bar to a constant load displacement rate of 0.004 inch per minute. The load was stopped after the initial break of the concrete bar at the trough point prior to the load building again. The steel bar was then removed and the precracked concrete bar tested for residual strength using a 0.01 inch per minute deflection rate. The average residual strength (ARS) was calculated using the equation:

$$ARS=(L/bd^2)(P_a+P_b+P_c+P_d)/4$$

Where L is the span in mm, b is the average width of the bar in mm, d is the average depth (height) of the bar in mm and $P_a+P_b+P_c+P_d$ are the recorded loads at 0.5, 0.75, 1.0 and 1.25 mm deflections. The average residual strength was 0.88 MPa.

Examples 3 and 4

Examples 3 and 4 were made in the same way as Example 1, except that Example 3 contained 0.1 and Example 4 contained 0.05 volume percent of fiber. The average residual strength for Example 3 was 0.31 MPa and Example 4 was 0.26 MPa.

Plastic Shrinkage Cracking Examples

The testing method used to evaluate plastic shrinkage cracking was similar to the one described by N. Banthia, et al., *Restrained Shrinkage Cracking in Fiber Reinforced Concrete: A Novel Test Technique, Cement and Concrete Research*, Vol. 26, No. 1 (1996).

Example 5 (Concrete Containing 0.1 Percent by Volume Fibers)

Before making the concrete of Example 4, a base mix is prepared in which the concrete of this Example is cast upon to perform the plastic shrinkage test. The base concrete was prepared by blending 1 part by weight (pbw) of Portland cement (Holnam Type 1), 1.36 pbw of sand (2NS), 1.36 pbw of Pea Gravel, 0.42 pbw of tap water, 0.0061 pbw of Superplasticizer available from WR Grace (assumed 40 percent solids-WRDA-19) and 0.11 pbw of fumed silica. The base was mixed in the same manner as in Example 2.

The base concrete mix was cast into a petroleum jelly coated mold that was 910 mm long, 89 mm wide and 40 mm tall. After smoothing the top surface, aggregates that are approximately 25 mm in diameter are evenly spaced over the entire surface with an aggregate density of approximately 12 aggregates per 100 $cm^2$. This base was then covered with plastic and allowed to cure for 24 hours. The base was then removed from the mold, sprayed with water, and placed into a plastic bag and cured for at least about 14 days.

A concrete mix of this Example was prepared by blending 1 part by weight (pbw) of Portland cement (Holnam Type 1), 1 pbw of sand (2NS), 0.05 pbw of fumed silica, 1 pbw of Pea Gravel, 0.48 pbw of tap water, and 0.025 percent by volume of the fiber of Example 1. The concrete mix was mixed in the same manner as in Example 1. After mixing, the concrete mix was cast into a petroleum jelly coated mold having the concrete base at the bottom of the mold. The mold was slightly larger than the base. The mold and base were placed in a chamber at 46° C. with a wind speed of about 340 cubic feet per minute (relative humidity of about 10 percent to 12 percent). After about 90 minutes, the mold is removed. After 24 hours, the sample is removed and the area of the cracks in the concrete are determined to give the plastic shrinkage crack area.

The plastic shrinkage area is determined by measuring fine cracks with a ruler and multiplying by 0.056 mm to approximate the width. Fine cracks are cracks that have gaps not easily discernable by eye. The other cracks were photographed and the area of the crack determined by image analysis. The plastic shrinkage cracking area was 10 $mm^2$.

Examples 6 and 7

These examples were prepared in the same way as Example 5, except that the amount of fiber in the concrete of Example 5 was 0.05 and Example 6 was 0.025 percent by volume. The plastic shrinkage cracking area was 62 and 28 $mm^2$, respectively.

Comparative Example 1

This example was prepared in the same manner as Example 5, except that no fibers were used. The plastic shrinkage cracking area was 350 $mm^2$.

What is claimed is:

1. A concrete article comprised of concrete having therein a monofilament reinforcing fiber comprised of a core that is a polyolefin, that is at least partially enveloped by a sheath, that is a copolymer of an olefin and at least one olefinically unsaturated comonomer selected from an unsaturated carboxylic acid, alkyl acrylate, alkyl methacrylate and vinyl ester wherein the fiber has a denier of at most 12.

2. The concrete article of claim 1 wherein the fiber is present in the article in an amount of 0.01 to 0.2 percent by volume.

3. The concrete article of claim 2 the polyolefin is polypropylene and the olefin is ethylene and the comonomer is acrylic acid.

4. The concrete article of claim 3 wherein the copolymer has at least 0.1 percent to at most 50 percent by weight of acrylic acid.

5. The concrete article of claim 3 wherein the fiber has a denier of at least 0.1.

6. The concrete article of claim) 5 wherein the denier is at most about 8.

7. The concrete article of claim 6 wherein the denier is at least 1.

8. The concrete article of claim 1 wherein the olefin is ethylene and the copolymer has at least 0.1 percent to at most 50 percent by weight of the olefinically unsaturated comonomer.

* * * * *